United States Patent [19]

Christie, Jr. et al.

[11] 4,003,660

[45] Jan. 18, 1977

[54] SENSING HEAD ASSEMBLY FOR MULTI-COLOR PRINTING PRESS ON-LINE DENSITOMETER

[75] Inventors: John S. Christie, Jr.; Richard S. Hunter, both of McLean; S. Upton Jenkins, Fairfax, all of Va.

[73] Assignee: Hunter Associates Laboratory, Inc., Fairfax, Va.

[22] Filed: Dec. 3, 1975

[21] Appl. No.: 637,391

[52] U.S. Cl. .............................. 356/178; 250/226; 356/186; 356/195; 356/199; 356/212

[51] Int. Cl.² .......................................... G01J 3/50

[58] Field of Search .......... 356/173, 178, 186, 195, 356/199, 212, 202, 203, 179; 250/226

[56] References Cited

UNITED STATES PATENTS

| 3,748,046 | 7/1973 | Murray | 356/195 |
|---|---|---|---|
| 3,756,725 | 9/1973 | Manning | 356/195 |

Primary Examiner—Edward S. Bauer
Assistant Examiner—F. L. Evans
Attorney, Agent, or Firm—Charles W. Helzer

[57] ABSTRACT

A sensing head assembly for a multi-color printing press on-line densitometer movably mounted on support members that extend across the width of a printed web of paper that has printed thereon, in addition to the printed matter being monitored, a plurality of spaced-apart color bars that extend across the width of the paper at predetermined intervals along its length. During operation, the sensing head assembly is traversed back and forth across the width of the material in a manner such that a sensing head assembly views a selected color bar at different points along the width and length of the printed web of material. At least two high luminance lamps are mounted within the sensing head housing for projecting light through a window onto a specimen plane of the material being printed to thereby define an inspection zone for illuminating a single selected color bar at any point along the width and length of the printed material. A receptor objective lens having a maximum numerical aperture views the area of the printed material passing through the inspection zone and illuminated by the high luminance lamps and projecting an image plane through an aperture plate that is located in a position just below the best focused color bar image. The aperture plate has a respective aperture opening for each discrete elemental color area comprising the color bar and high impedance semiconductor light sensitive photodetector cells are positioned to allow a respective elemental color light passing through the respective aperture openings to impinge on their light sensitive surface. If desired, respective complimentary color filter elements may be positioned intermediate the aperture openings and the photodetectors.

40 Claims, 16 Drawing Figures

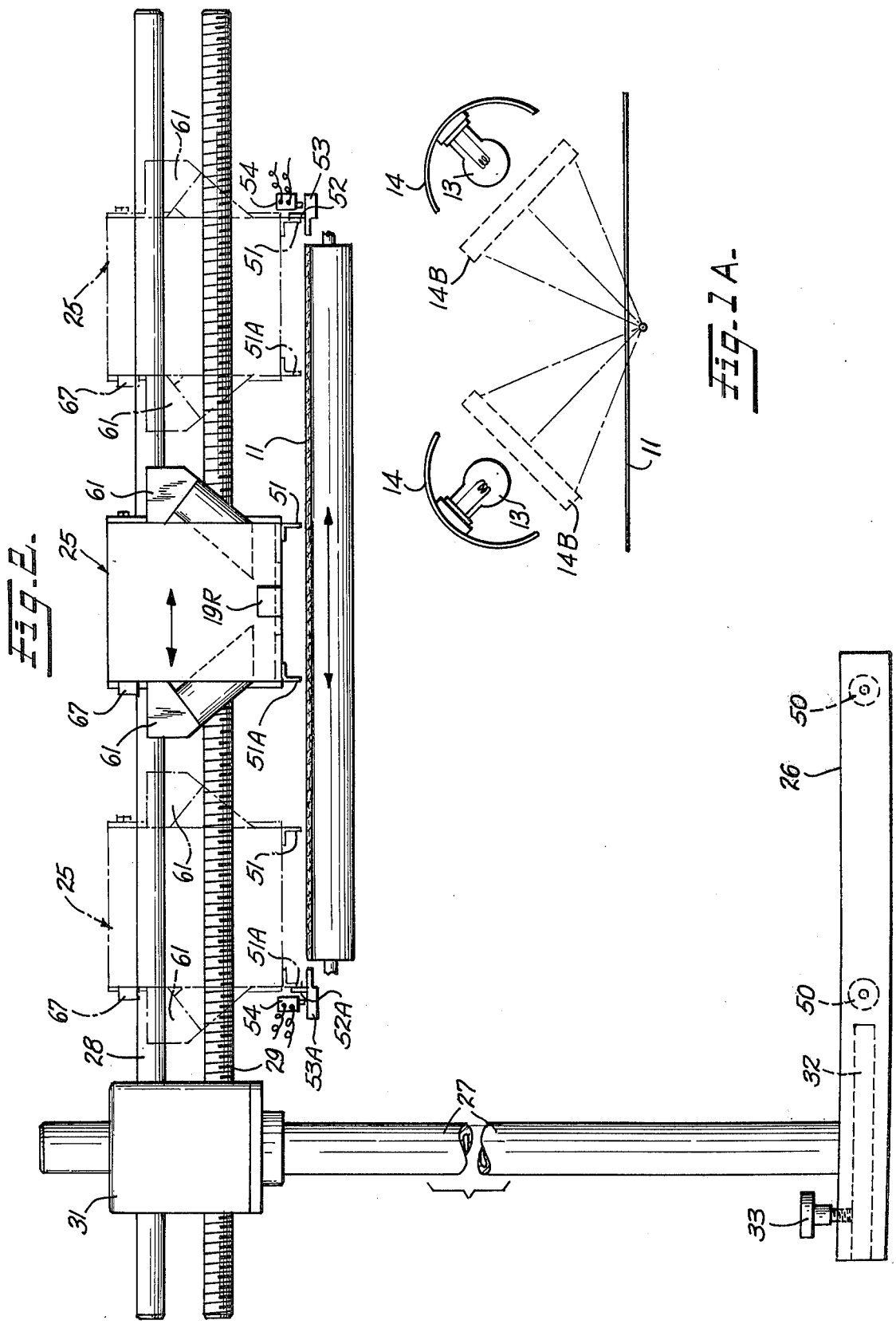

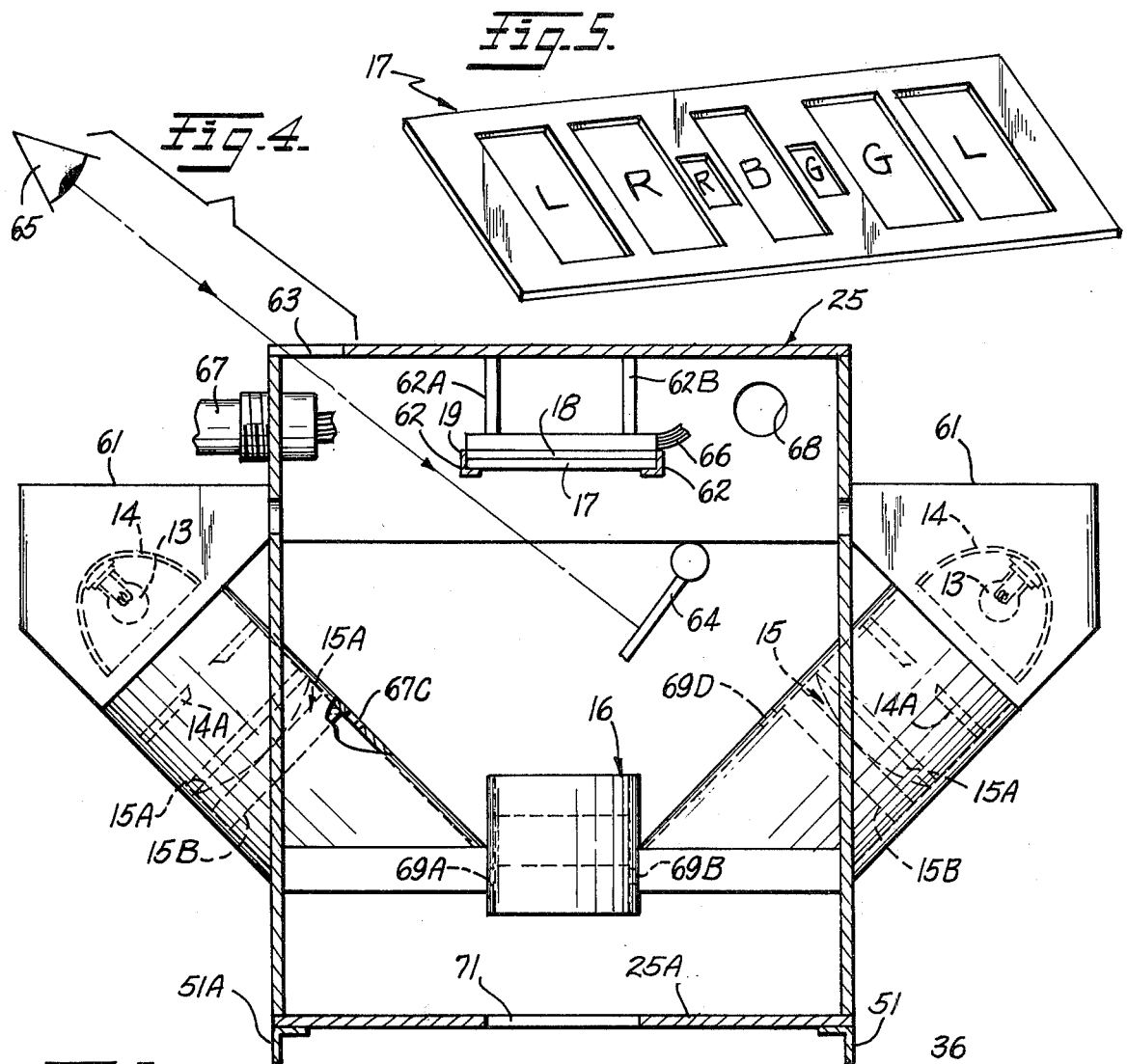
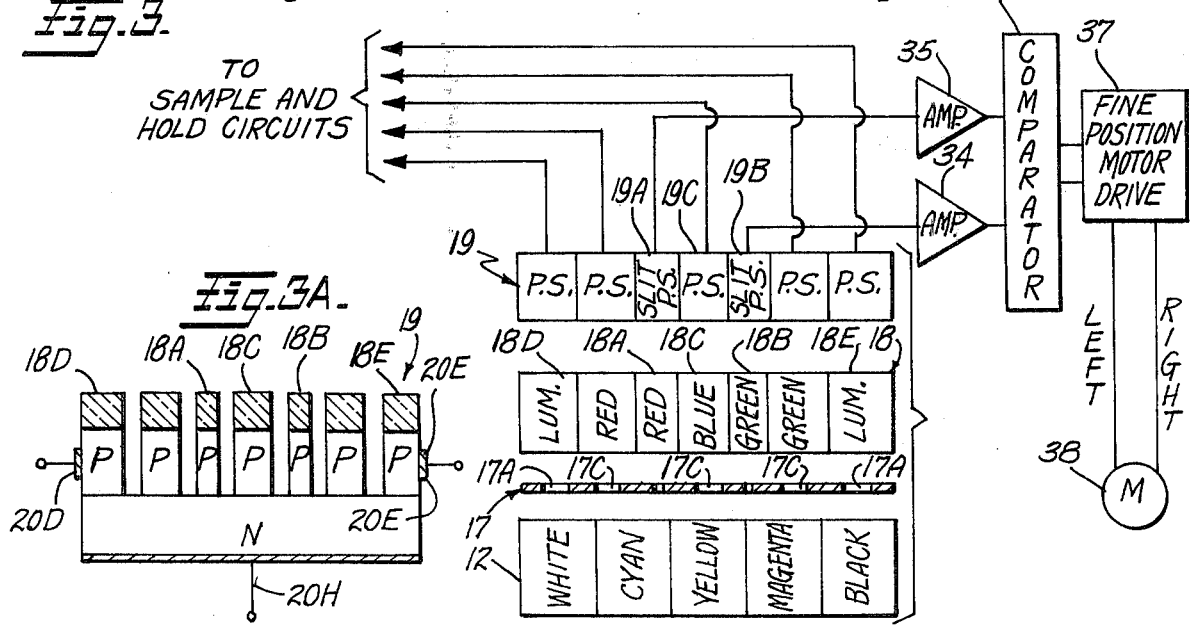

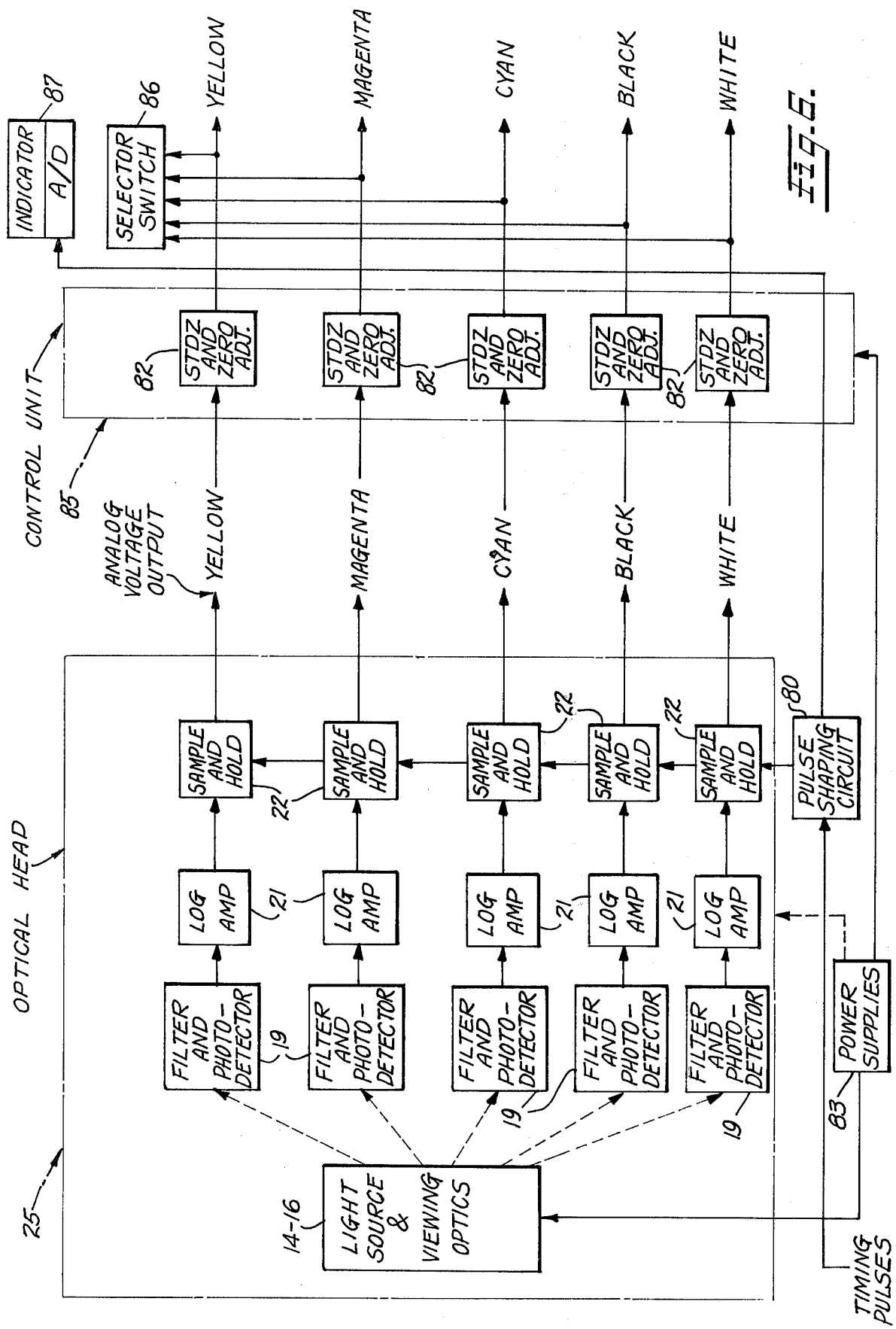

NARROW APERTURE

- COLOR BAR LEADING EDGE ENTERS APERTURE
- BAR FILLS APERTURE
- TRAILING EDGE ENTERS APERTURE
- TRAILING EDGE LEAVES APERTURE

REFLECTANCE SIGNAL AMPLITUDE vs TIME

WIDE APERTURE

1ST. DIFFERENTIAL ($dr/dt$) vs TIME

2ND. DIFFERENTIAL ($d^2r/dt^2$) vs TIME

SENSING HEAD ASSEMBLY FOR MULTI-COLOR PRINTING PRESS ON-LINE DENSITOMETER

BACKGROUND OF INVENTION

1. Field of Invention

This invention relates to a new and improved sensing head assembly for use as an on-line densitometer on multi-color printing presses.

More particularly, the invention relates to a sensing heat assembly which senses and derives output electric signals representative of the small spot reflectance of the ink colors (hence, density of the ink) used in a multi-color printing press. The assembly is designed for use on-line during normal printing operations of the multi-color press to provide continuous monitoring of the printing ink density. The output signals derived from the assembly can be employed to provide a visual read out to a press man who then can appropriately adjust the ink characteristics as it is applied to maintain some preset standard. Alternatively, the output signals can be applied directly to control ink application by an automatically controlled printing press.

2. Prior Art Problem

U.S. Pat. No. 3,756,725 — issued Sept. 4, 1973 discloses an apparatus and method for determining the density of color reproduction in a multi-color printing press while on-line during printing operations. The on-line densitometer disclosed in U.S. Pat. No. 3,756,725 employs a pulsed, elongated flash lamp light source which illuminates a multiplicity of test patches and adjacent reference surfaces simultaneously, and the pulsed light source must be gated-on in synchronism with the movement of the color test patches and adjacent reference surfaces past an inspection zone. Such an arrangement possesses built-in complexity that necessitates the inclusion of complex and expensive synchronization circuitry for the pulsed flash lamp light source. To maintain this synchronizing circuitry in proper working order requires highly paid, skilled technicians and requires a relatively high initial cost for manufacture and installation of the system. In addition, the use of the pulsed flash lamp light source to derive the color density output signals, introduces undesired transients in the normal operation of the instrument which complicate its calibration and proper alignment. Further, the use of an elongated light source for illuminating a multiplicity of color bars extending across the width of the material being monitored, can introduce non-uniformities in illumination of the color bars as they are read out. To make available an improved on-line densitometer sensing head assembly which does not possess these undesirable characteristics, the present invention was devised.

SUMMARY OF INVENTION

It is therefore a primary object of the present invention to provide a new and improved sensing head assembly for a multi-color printing press on-line densitometer.

Another object of the invention is to provide such a sensing head assembly which is relatively simple in design, construction, installation, and maintenance in comparison to known prior art densitometers, operates continuously, and provides fast response to facilitate quick adjustment to acceptable color printing.

A still further object of the invention is to provide an improved on-line densitometer sensing head assembly which allows better maintenance of color both along and across the length of a web of multi-colored printed material.

Still another object of the invention is to provide an improved sensing head assembly wherein the signals derived from the passing of the individual color areas of a color bar through the inspection area of the assembly can be used for control of registration during a multi-color printing operation.

In practicing the invention, an improved sensing head assembly is provided for a multi-color printing press on-line densitometer. The assembly is comprised by a sensing head housing movably mounted on support members that extend across the width of a web of material being printed by a multi-color printing press. Means are provided for traversing the sensing head housing back and forth across the width of the web of printed material with the material having printed thereon a plurality of spaced-apart color bars extending across the width of the material at predetermined intervals along its length. The color bars comprise a plurality of aligned discrete areas each printed with an elemental color such that each color bar includes all of the elemental colors appearing on the printed material. A multiplicity of high luminance lamps are mounted within the sensing head housing adjacent respective reflectors for projecting light through window means in the under side of the housing and onto a common convergence point located below the specimen plane of the material being printed to thereby define an inspection zone for illuminating selected color bars at any point along the width and length of the printed material. A receptor objective lens means is provided having a maximum numerical aperture for viewing an area on the printed material passing through the inspection zone and for projecting an image of a selected color bar onto an image plane located within the sensing head housing. An aperture plate is located at a position below the best focused color bar image and has respective aperture openings corresponding in position to each discrete elemental color area comprising the color bar. Opto-electric conversion means comprising small area, high impedance semiconductor light sensitive photodetector cells are positioned in back of respective aperture openings in the aperture plate and are responsive primarily only to a respective elemental color light corresponding to the discrete elemental color area of the color bar being imaged through the respective aperture openings.

In a preferred embodiment of the invention photometric standardizing means are provided for viewing by the receptor objective lens means during each traversal of the sensing head housing across the width of the printed material for providing a background data reference reflectance level. The photometric scale standardizing means comprise blocks having white and dark grey standard surfaces positioned at either end of the cross support members. The blocks are located under spring returned slide covers that are engaged and opened by the movable sensing head housing at the end of each traverse thereof across the width of the material being inspected to allow viewing of the blocks by the semiconductor light sensitive photodetector cells.

The semiconductor light sensitive photodetector cells are responsive to light rays within the entire visible spectrum and employ a respective filter member positioned in front of the cell designed to filter out all but a respective elemental color light or its complement.

To facilitate use of the assembly with different multicolor printing press operations, the respective light filter members may be secured together in a removable aperture plate tray for ready removal and replacement with light filter members having different color response characteristics.

The receptor objective lens means preferably is adjustable to allow optimum imaging of a color bar passing through the inspection zone onto the aperture plate. To facilitate alignment and focusing of the assembly, the sensing head housing further includes a mirror and suitably aligned viewing window positioned to allow an operator of the assembly to view the image of a color bar as it is projected onto the aperture plate.

Sample and hold circuit means are mounted within the sensing head housing and are responsive to the output electric signals from the respective semiconductor light sensitive cells for deriving respective output electric signals representative of the small spot reflectance and therefore the reciprocal of the printing density of the colored ink employed in printing each discrete elemental area of the color bars. Gating means are provided for sensing the presence of a color bar in the inspection zone and gating-on the sample and hold circuit means at a precise point in the movement of a color bar through the inspection zone. The gating means may comprise a separate photodetector for sensing a separately printed index mark on the printed material and developing a suitable gating-on signal pulse. Alternatively, the gating means may comprise a pulse shaping circuit coupled to the output from at least one of the semiconductor light sensitive cells for suitably shaping the output signal pulse produced upon a color bar passing through the inspection zone and providing a properly shaped and timed gating signal pulse coincidental with the movement of the longitudinal center of the color bar into the inspection zone.

In order to precisely control the traverse positioning of the sensing head housing, separate small area light responsive semiconductor cells are positioned on each side of a selected traverse positioning guide point with the additional, separate, small area light responsive semiconductor cells being highly responsive to elemental colors that are employed to define the selected traverse positioning guide point. Feedback circuit means are responsive to the output from the additional, separate small area semiconductor cells for deriving feedback positioning signals for supply to the drive means for traversing the sensing head housing back and forth across the cross support member whereby precise positioning of the sensing head housing across the width of the printed material at the same point over each repeated color block pattern, can be achieved.

A further advantageous feature made possible by the invention is the ability to develop suitable control signals for controlling registration of the various elemental color areas comprising each color bar. This is achieved by differentiating the output signals from the several photodetectors in cases where a narrow slit aperture is employed and the rise time of the signal pulses produced by the photodetectors is controlled by the width of the aperture. Where wide apertures are employed in the sensing head, double differentiation of the photodetector output signals may be required in order to provide signal pulses with short rise time which are dependent only on the sharpness of the leading edge of the elemental color areas comprising the color bars and the aperture opening rather than the width of the aperture. The sharply differentiated leading edge signal pulses may then be supplied to a registration control for the multicolor press as an aid in maintaining proper registration.

BRIEF DESCRIPTION OF THE DRAWINGS

These and other objects, features, and many of the attendant advantages of this invention will be appreciated more readily as the same becomes better understood by reference to the following detailed description, when considered in connection with the accompanying drawings, wherein like parts in each of the several figures are identified by the same reference character; and wherein:

FIG. 1A is a partial schematic view of the illuminating light sources and their associated reflectors and illustrates the manner in which light from the sources is focussed relative to a moving web of paper being monitored.

FIG. 2 is a schematic front view of the sensing head assembly comprising the invention showing it in relation to a web of multi-color printed material with the sensing head housing thereof illustrated in different traverse positions extending across the width of the web of multi-color printed material being monitored;

FIG. 3 is a schematic functional diagram illustrating an exemplary arrangement for a color bar pattern and its relation to the design of the aperture plate, filters, and photodetectors employed in the sensing head housing together with certain control and calibration circuitry used with the sensing head assembly and comprising part of the invention;

FIG. 3A is a sectional view of an alternative construction for the photodetector array constructed in accordance with microminiature circuit fabrication techniques and which eliminates the need for separate aperture and filter plates;

FIG. 4 is a partial sectional view showing certain mechanical details of construction of the sensing head housing;

FIG. 5 is a perspective view of a removable aperture plate and filter assembly employed in the sensing head housing shown in FIG. 2;

FIG. 6 is a functional block diagram of the signal processing circuitry employed with the sensing head assembly;

DETAILED DESCRIPTION OF PREFERRED EMBODIMENT

Figure 1:
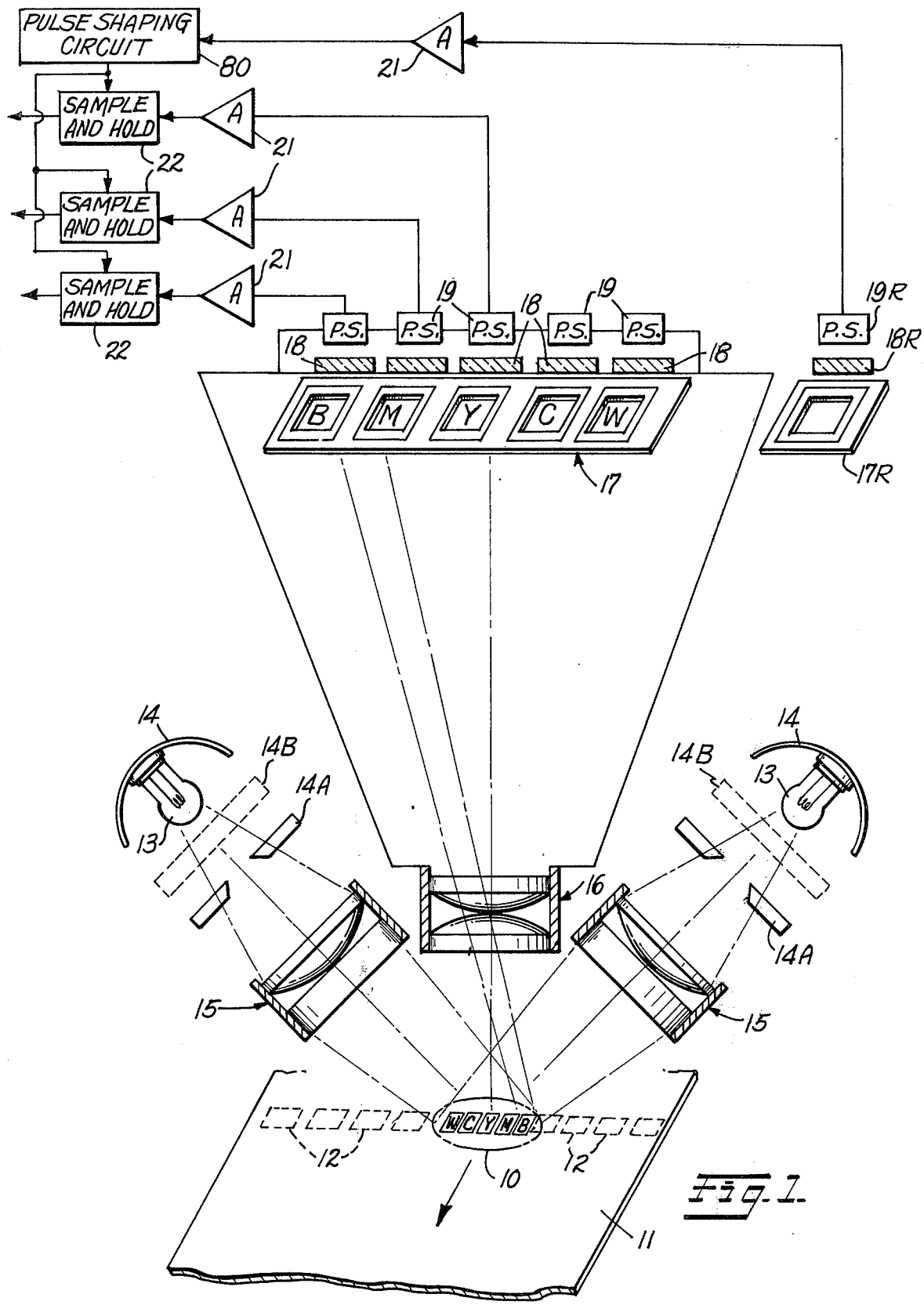
FIG. 1 is a schematic, functional block diagram of a new and improved sensing head assembly constructed in accordance with the invention and showing it in conjunction with a moving web of multi-color printed material for use as an on-line densitometer for multicolor printing presses.

FIG. 1 is a schematic, functional block diagram of a new and improved sensing head assembly constructed in accordance with the invention for use as an on-line densitometer for multi-color printing presses. The sensing head assembly comprises a small spot reflectometer 10 that is used to measure the reflectance, and therefore the printing density of the ink colors used in a multi-color printing operation. The device is used to monitor the reflectances of a multi-colored printed material while the press is in operation, and for this purpose is designed to be mounted on the press over the moving web of multi-color printed material shown at 11. The sensing head assembly can be used with both sheet and web presses, and is relatively unaffected by the method of ink application (i.e.; off-set or letter press). It is preferred to provide a narrow strip of color bars 12 which extend completely across the sheet or web of printed material 11 and are printed on the web material by the press cylinders. It is anticipated that there will be a color bar for each ink control key provided on the multi-color printing press. The color bars comprise a plurality of aligned, discrete areas each printed with an elemental color so that each color bar includes all of the elemental colors being printed on the material and, if desired, may also include an ink-free area for sensing the substrate reflectance (white). A typical color bar pattern may be comprised of blocks, either rectangular or square, which are of the order of one-eighth of an inch to one-quarter of an inch in length and width. A four color printing operation would have white (the paper itself), cyan, yellow, magenta, and black squares placed side by side to form the color bar. The color bars 12 are printed side by side in a line across the width of the sheet of printed material and the line of color bars is repeated many times at periodic intervals along the length of the web.

In FIG. 1, a typical color bar pattern 12 has been exploded to show it in detail in the center of the web of printed material. The sensing head assembly is positioned over the web of printed material to view the color bars and is comprised by a multiplicity of high luminance lamps indicated at 13 which may be positioned within suitable elliptical reflectors shown at 14 for projecting a highly intense beam of light at an angle of incidence of substantially 45° with respect to the plane of the multi-color printed material 11. While two high luminance lamps have been illustrated in FIG. 1, it is believed obvious that three, four, or more lamps could be employed and appropriately arranged to project an elliptically shaped spot of light onto a central area or zone 10 which is defined as the inspection zone for illuminating only a selected color bar along the width of the web of printed material as the color bar passes through the inspection zone 10. For this purpose light from each of the high luminance lamps 13 may be projected through a respective aperture 11A and a modified condensor lens assembly 15 whose construction will be described more fully hereafter in connection with FIG. 4 of the drawings. The condensor lens assemblies 15 focus the light to form a rectangular or elliptically-shaped spot of light that defines the inspection zone 10 for encompassing only a single color bar 12 on the surface of the web of printed material 11.

Alternately, the light may be focused directly on the color bar pattern by means of the elliptical reflectors as shown in FIG. 1A. Preferably the reflectors 14 are dichroic reflectors for minimizing infra-red components from light imaged on the inspection area 10. If dichroic reflectors are not employed, then infra-red filters shown in dotted outline form at 14B may be employed.

Light reflected from each of the elemental color areas comprising a color bar passing through the inspection zone 10 is imaged upon a receptor-objective lens assembly 16. The receptor-objective lens assembly 16 comprises wide aperture, flat field lens assembly for collecting and focusing light received from each of the elemental color areas in the color bar and projecting an image of the color bar upon an aperture plate assembly 17. The aperture plate 17 serves to isolate a particular area of each of the elemental colors comprising the color bar and passes the respective elemental color image through a complimentary filter shown at 18 to cause it to impinge upon the photosensitive surface of a respective photosensitive device 19. The photosensitive device 19 preferably comprises a semiconductor photo diode or other high impedance, fast responding photodetector. The photosensors 19 develop respective electric output signals which are representative of the reflectance and hence density of each of the elemental colors comprising the color bar. The electric output signals are then supplied through suitable amplifying circuits 21 preferably to sample and hold circuits 22 for display and use by an operator of the multi-color printing press for making appropriate adjustments to the ink control keys to maintain predetermined color density standards. If desired, this can be done automatically if an automatically controlled multi-color printing press operation is being monitored.

FIG. 2 of the drawings illustrates in greater detail the manner in which the sensing head assembly is mounted with respect to the moving web or sheet of multi-color printed material shown at 11. The sensing head assembly is contained within a sensing head housing 25 that is supported by a base stand 26 and vertical column 27 for rotatably supporting a cantilevered guide arm 28 and reversible rotating drive screw 29 or other similar linear drive for causing the sensing head housing 25 to scan back and forth across the width of the web of printed material 11 in the manner indicated by the dotted outline forms. The cantilevered guide arm 28 and reversible, rotating screw drive 29 are conventional in construction and are secured to and extend from a motor housing 31 having contained therein a reversible electric motor for driving the reversible, screw drive 29 to cause the sensing head housing 25 to be moved either right or left depending upon the direction of rotation of the rotating screw drive. The motor housing 31, cantilevered guide arm 28 and rotating screw drive 29 are secured to the vertical column 27 and the entire assembly may be mounted in a swivel or thrust bearing circular plate 32 rotatably seated in base 26 and held in place by a set screw 33. By this means the assembly can be rotatably adjusted to facilitate proper alignment of the guide arm 28 and screw drive 29 over the web or printed material 11. Retractable wheels shown at 50 are provided on base member 26 to allow the assembly to move in or out relative to the web of printed material on the support rolls or to allow access for servicing the printing press.

In operation, the reversible motor 31 for rotating screw drive 29 that causes the sensing head housing 25 to be positioned at some desired traverse position across the width of the web of multi-color printed material 11, may be operated open loop from a control computer that is programed to position the sensing head housing at predetermined points across the width of multi-colored printed material in accordance with known statistical sampling procedure whereby authentic sampling of the density of the elemental color areas comprising the color bars is achieved in order to effectively monitor the multi-color printing operation. The sensing head housing 25 is traversed at a slow rate and at predetermined traverse points determined by the program of the control computer, the sensing head drive motor is stopped in order to sense several color bars in sequence. In this manner an average signal representative of the reflectance of the elemental color areas at the sampled points, is obtained.

To assure proper width-wise traverse positioning of the sensing head housing during read-out, independant of small variations in the lateral position of the color bars, the arrangement shown in FIG. 3 of the drawings is employed. FIG. 3 depicts the manner in which the sensing head housing 25 is centered over an appropriate color bar for reading out the density of the respective elemental color areas comprising the color bar. In FIG. 3 an exemplary color bar, shown at 12, is comprised by a white color area, the elemental color areas of cyan, yellow and magenta, and a black color area. It should be noted that the central yellow elemental color area is bordered on one side by cyan and on the other side by magenta. The aperture plate 17 is designed such that it has aperture openings 17A which correspond substantially in size to the size of the color bars whose images are projected onto the aperture openings by the receptor-objective lens assembly 16. In addition to the normal aperture openings 17A for the elemental colors and white and black, the aperture plate 17 includes additional, separate, small slit-like aperture openings 17B on each side of the centrally disposed aperture opening 17C associated with the yellow elemental color area of the color bar.

The corresponding complimentary filter elements comprising the filter assembly 18 consist of the complimentary filter elements red, blue, green, and luminous filter elements at each end. The luminous filter elements optical characteristics approximate very closely the response characteristics of the human eye and are included in order to obtain a reading indicative of the final appearance of the material being monitored. The red, blue, and green complimentary filter elements correspond respectively to the elemental colors cyan, yellow and magenta. In addition to the complimentary filter elements enumerated above, separate, additional small slit-like red and green filter elements are included in the filter assembly 18 as shown at 18A and 18B and are disposed on each side of the centrally located complimentary blue filter element 18C which is designed to receive light from the central yellow color elementary area of the color bar 12.

The respective photosensitive semiconductor cells that form the photosensitive assembly 19 may comprise photo diodes, photo triodes or the like but preferably constitute, small area high impedance silicon semiconductor photodetector diode cells. Such cells are manufactured and sold by a number of semiconductor manufacturers and are designed to respond to all light waves within the visible spectrum. In addition to the semiconductor photodetector cells associated with each of the filter elements for the elemental color areas comprising the color bar 12, additional slit-like photosensitive cells 19A and 19B are provided on each side of the central photosensitive cell 19C and are designed to respond respectively to light from the cyan and magenta elemental color areas of color bar 12 that are on each side of the yellow elemental color area which is centrally disposed in each color bar. The electrical outputs from the separate additional slit photodetector cells 19A and 19B are supplied through respective amplifiers 34 and 35 to comparator circuit 36. The comparator circuit 36 has its output connected to operate the fine servomotor control indicated at 37 which in turn controls the direction, rate, and extent of rotation of a servomotor indicated at 38. Motor 38 is contained within the housing 31 and is mechanically coupled to drive the reversible rotating gear drive shaft 29 so as to appropriately position the sensing head housing 25 over the center of a desired color bar. Thus, it will be appreciated that in the example shown in FIG. 3, the central yellow color area is chosen to define a traverse positioning guide point.

In operation, the computer or other operator controlled source of command signals causes the coarse servomotor control (not shown) to rotate motor 38 and reversible gear drive shaft 29 in an open loop manner in response to a command from the computer or other controlled device, and moves the sensing head housing 25 roughly into width-wise traverse position across the web of multi-colored printed material 11 so as to locate the sensing head housing substantially over a desired color bar. With the arrangement shown in FIG. 3, should the central yellow color image fall either to one side or the other of its proper central position relative to aperture plate 17, it will produce in the adjoining, separate additional slit-shaped photosensor 19A or 19B a strong imbalanced signal response. This strong signal response out of either of the separate, additional slit-shaped positioning photo cells 19A or 19B, is amplified in either of the amplifiers 34 or 35 and supplied to comparator 36. Comparator 36 then causes the fine position servomotor drive 37 to excite reversible motor 38 to drive the sensing head housing 25 either right or left so as to balance the signals from separate photodetector cells 19A and 19B and null the signal from the comparator. This results in exactly positioning the sensing head housing with the central aperture 17C of aperture plate 17 and blue filter element 18C of the filter assembly 18 aligned over the yellow elemental area of the color bar. Thereafter, each of the elemental color area responsive photodetector cells comprising the photosensor array 19 will respond to the reflected image of the respective elemental color light to which they are designed to respond and develop in their output respective, elemental color output signals proportional to the reflectance, and hence, density of the color ink employed in the printing of the color bars.

FIG. 3A of the drawings shows an alternative construction for a photosensitive detector array fabricated in accordance with known microminature semiconductor integrated circuit fabrication techniques and usable with the fine positioning motor drive control illustrated in FIG. 3. In FIG. 3A, an array of photosensitive, high impedance semiconductor PN diode cells are shown at 19 with each elemental cell being designed to respond to a particular elemental color light or alternatively to white or black light. The light impinges on the light sensitive areas of the diodes through selective filter layers such as 18A, 18B and 18C deposited over the light sensitive areas of the respective PN diodes by well known photoresist masking and etching techniques. Thus the filter layer 18A will pass red light, 18B passes green light, 18C passes blue light and 18D and 18E comprise luminous filter layers similar to the corresponding elements of the filter assembly 18 shown in FIG. 3. The respective, different filter layers are deposited over respective P-type conductivity layers previously formed on an underlying N-type conductive substrate by well known diffusion or epitaxial growth processes. Ohmic contacts are provided to each respective P layer of the PN diode photodetector thus formed as shown at 20D and 20E and the common N layer as shown at 20H. The desired reflectance signals supplied to the respective sample and hold circuits are obtained from the respective P layer contacts such as 20D and 20E. To simplify the drawings the remaining P layer contacts have not been illustrated. Due to the advanced technology of semiconductor industry, manufacturers are now able to produce semiconductor arrays of the above-described type which are responsive to any desired portion of the visible spectrum with high selectivity. Thus, in the arrangement of FIG. 3A each of the semiconductor photodetector PN cells comprising the total array 19 are designed to respond only to a particular elemental color light of a color bar being monitored. Proper selectivity in the response of the different elemental color responsive photodetector cells is assured because the selective filter layers such as 18A, 18B, etc. allow only light of a given color to pass through and impinge on the photosensitive surface of the PN photodetector cell. Consequently, a separate aperture plate is not required. Preferably, the entire array 19 of photodetector cells including the selective filter layers 18A, 18B, etc., may be fabricated on a single monolithic chip in accordance with well known microminiature semiconductor integrated circuit fabrication techniques and employed as a replaceable element in the sensing head housing 25 in place of the aperture plate 17, filter array 18, and photodetector array 19. It is believed obvious that different arrays would be designed to respond to different color bar arrangements in order to accommodate different multi-color printing operations. Hence, the sensing head assembly readily could be changed and easily adopted by an operator of the equipment to accommodate any given multi-color printing operation.

In addition to the above described transverse positioning feature, FIG. 2 illustrates the manner in which a standardizing signal is obtained with the equipment at the end of each width-wise traverse of the sensing head housing 25 for use in calibration of multi-color output signals derived from the respective photosensitive semiconductor cells 19. For this purpose, the sensing head housing 25 has a pair of projections 51 and 51A which extend from each of the lower sides thereof. The projections 51 and 51A are designed to engage and coact with a corresponding set of projections 52 and 52A which extend from the spring-returned cover plates of a pair of small housing blocks 53 and 53A, respectively. The housing blocks 53 and 53A are separately mounted at each side of the web of printed material and enclose a respective dark grey porcelain standard and a white porcelain standard. The dark grey and white porcelain standards mounted in blocks 53 and 54 are exposed at the end of each traverse of the sensing head housing 25 by the respective extensions 52 and 52A being engaged by the coacting extensions 51 and 51A. The sensing head housing traversing action then slides the spring-return protective cover open at a point in the traverse while the optical head in housing 25 is positioned to view the exposed dark grey porcelain standard or the white porcelain standard. When exposed in this manner an image of the standard is projected through all apertures in the aperture plate 17 to impinge upon all of the respective photodetector cells. The electric output signals derived from the photodetector cells then are supplied through respective amplifiers to the computer for use in standardizing the response of the system along with electric signals generated by the closure of a microswitch 54 or 54A that are engaged by the projections 51 and 51A simultaneously with the opening of the standards. By this means the computer or other standardizing arrangement, is instructed that the standards are being viewed and standardizing signals are being supplied. The standard signals thus supplied can then be used by the computer to develop a standardizing ratio that then is applied in the processing of signals from the respective photodetectors while the color bars are being viewed for maintaining calibration of the sensing head assembly. If desired, the standardizing output signals obtained in this manner could be fed back in a closed loop manner to regulate the response of the amplifiers in the output from the photodetector cells in a well known manner and/or to regulate the intensity of the high luminance lamps 13. However, where the sensing head assembly is to be used in an automatic control with a central computer for maintaining preset ink density standards, the supply of the standardizing signals to the computer for developing a standardizing ratio applied to the photodetector outputs in the above briefly described manner, is the preferred method of maintaining calibration of the equipment.

FIG. 4 of the drawings is a sectional view of the construction of the sensing head housing 25 and illustrates some of its structural details. As shown in FIG. 4, the high luminance light sources 14 are mounted in extensions 61 on either side of the main housing 25. The high luminance light sources may comprise quartz hologen cycle lamps mounted within elliptical reflectors 14 for projecting a high intensity beam of light through aperture openings 14A and a modified condensor lens assembly 15 onto an image place so as to result in the production of the high intensity, elliptically shaped spot of light indicated at 10 in FIG. 1. This defines the inspection zone through which the color bars being monitored are caused to pass. In order to reduce the effect of distance variations between the specimen, multi-color printed material being monitored and the optical port through which the color bars are imaged in the sensing head housing, the specimen plane (plane of the multi-colored printed material being monitored) is located inside the convergence points of the illuminating beam formed by the plurality of high luminance light sources. While only two high luminance light sources 13 and associated reflectors 14 have been shown, it is believed obvious to one skilled in the art that four or even more light sources could be arrayed around the optical port in the bottom of the sensing head housing in order to provide an adequate level of illumination to the inspection zone for a particular monitoring job. Of course parabolic or some reflector configuration other than elliptical can be employed; however, it is preferred to use dichroic reflectors for reducing infra-radiation to a minimum. If dichroic reflectors are not used, then it may be necessary to include infra-red filter elements such as shown at 14B in FIG. 1 in the light path projected from lamps 13.

The image of a color bar passing through the inspection zone is picked up by a receptor objective lens assembly 16 which is designed to provide a maximum numerical aperture in order to deliver sufficient diffusely reflected light flux to the photodetector cell assembly. The image of the respective, elemental color areas of the color bar is projected through the aperture plate 17 and filter element 18 onto the photosensitive surfaces of the small area, photodetector cells 19 as shown in greater detail in FIG. 3. FIG. 5 is a perspective view of a suitable aperture plate 17 for the particular sensing head assembly being described. The aperture plate 17 and associated respective filter elements 18 may be combined in a suitable, readily removable tray shown at 62 to facilitate change over of the equipment for use with different multi-color printing monitoring operations. The signals produced by the several photodetector cells 19, which are selected for high impedance to achieve minimum noise gain, are supplied to suitable amplifiers and thence to sample and hold processing circuitry as will be described hereinafter with relation to FIG. 6.

As stated earlier, the specimen plane of the multicolor printing material being monitored is located just inside the convergence points of the illuminating beams supplied from the light sources 13 in order to reduce the effect on the output signal of distance variations between the optical port on the underside of the sensing head housing 25 and the specimen being monitored. To further reduce the effect of such distance variations, the aperture plane defined by aperture plate 17 is located just below the best focused color bar image by appropriate adjustment of the receptor-objective lens assembly 16. To facilitate alignment of the optical element to achieve this effect, the sensing head housing 25 is provided with an additional window shown at 63 and a small adjustable mirror 64 located to one side of the optical path of the sensing head housing. The adjustable mirror 64 is provided with a small handle (not shown) which can be manipulated by an operator of the equipment whose eye is indicated at 65. By viewing through the peep hole or window 63 and viewing the image of the color bar on the aperture plane 17, the operator readily can adjust the equipment to provide the above described beneficial settings for reducing the effect on the output signal of distance variations between the bottom optical port and the specimen plane.

The objective lens assembly 15 which may be used in conjunction with each of the high luminance light sources to project the elliptically shaped, high intensity spot of light defining the inspection zone may be comprised by a 39 millimeter diameter spherical lens element 15A mounted with its convex surface opposing a 54 millimeter diameter cylindrical lens element 15B. The modified cylindrical condensing lens assembly thus comprised is used in conjunction with each elliptical reflector high luminance light source 13 provided on the sensing head housing.

The receptor-objective lens assembly 16 may be comprised by a Schneider flat field enlarging lens having an $f/2.8$ wide aperture. The receptor-objective lens assembly thus comprised is mounted in a vertically adjustable holder to allow for optimum imaging of the color bar images on the aperture plane of the sensing head housing in the manner described above.

Due to the presence of the high luminance light sources 13 within the sensing head housing 25 it is necessary to provide forced circulation of cooling air. The cooling air is provided by a cooling fan (not shown) mounted on the back of housing 25, and coupled to the interior of housing 25 through a port 68. The interior of the main portion of housing 25 serves as a large plenum for the cooling air and is coupled through ports 68A and 68B to wing portions 61 of the housing 25 in which lamps 13 are mounted. Circulation of the cooling air is assured by the provision of ports such as shown at 69A, 69B, 69C and 69D to provide a positive flow of cooling air out through the ports and across the optical surfaces such as 15B and 16B to prevent dust build-up on these surfaces. Suitable baffling used in conjunction with the exterior surfaces of the elements mounted within sensing head housing 25 assures necessary circulation of the cooling and cleansing airflow within the sensing head for temperature stabilization purposes. While the optical port in the bottom surface 25A of the sensing head housing 25 has been illustrated as open to allow the receptor-objective assembly 16 to view the inspection zone produced by the projected illuminating beams of light, for certain applications it may be necessary to include a closed optical surface or window over the open port 71 to assure cleanliness of the area within the sensing head housing. If such an optical window is employed, then a cleansing flow of air over this surface would be provided.

FIG. 6 is a functional block diagram of the electrical signal processing system employed with the invention. In FIG. 6, the light source and viewing optics contained within the sensing head housing 25 are indicated at 14–16. Separate images of the respective elemental color areas of the color bar are passed through the respective filters to impinge upon the photodetectors 19 that develop at their outputs an electric signal representative of the small spot reflectance of the respective elemental color areas. The reflectance signals are supplied to the input of a respective logarithmic amplifier 21 which performs a logarithmic conversion of the reflectance signal to provide at their output a signal representative of the reciprocal of the density of the respective elemental color areas comprising the color bars. These color density signals are applied to sample and hold circuits 22 which provide at their output a continuously available analog voltage signal representative of the respective elemental color areas color density such as yellow, magenta, cyan, black and white. Suitable timing signal pulses obtained from the register mark detector 19A shown in FIG. 1 are supplied through a pulse shaping circuit 80 for supply to each of the respective sample and hold circuits 22 for controlling the timing of sampling the outputs from the respective log amps 21. A suitable power supply 83 is provided for supplying electric power to the various electric circuits and components in the optical head as well as the circuit contained in the control unit 85 that may be either a separate unit or comprise an integral part of the optical head 25. The control unit 85 includes an individual standardizing and zero adjust circuit 82 for each of the elemental color signal channels yellow, magenta, etc. In addition, the control unit 85 preferably includes a selector switch 86 and an analog/digital indicator 87.

Figure 7:
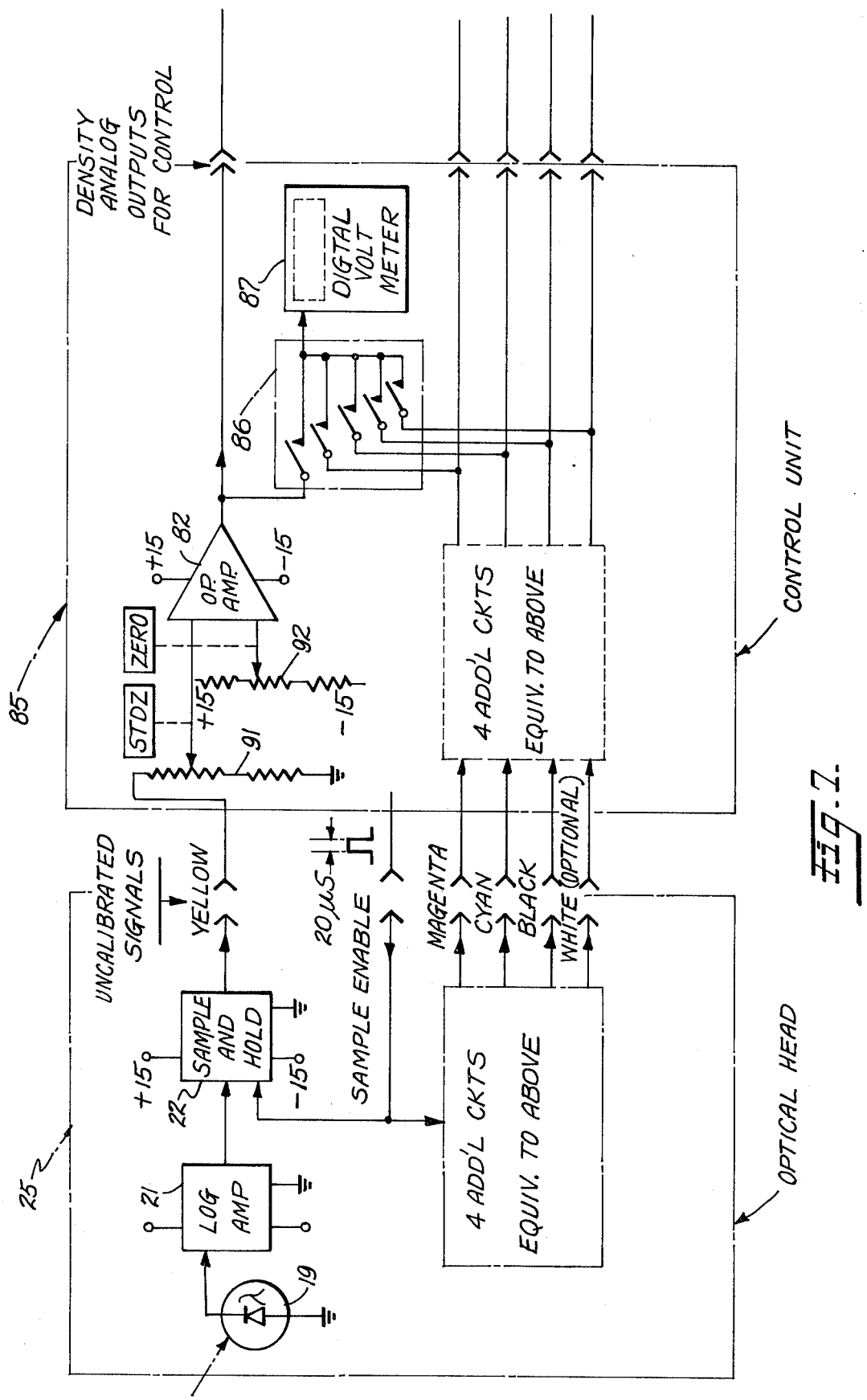
FIG. 7 is a more detailed circuit block diagram of the construction of one of the color signal processing channels comprising a part of the system shown in FIG. 6.

FIG. 7 is a more detailed schematic block diagram illustrating the construction of one of the elemental color signal processing channels, yellow, for example. Light from the yellow elemental color area of the color bar after passing through the aperture plate and the blue filter impinges upon the photodetector cell 19 where it produces an electric signal proportional to the intensity of the yellow light flux. This electrical signal is amplified in a log amp 21 which may, for example, comprise a commercially available, integrated circuit logarithmic amplifier such as the Analog Devices 755P manufactured and sold by Analog Devices, Inc. At this point it should be noted, that if one desires to obtain output signals from the sensing head assembly which are proportional to reflectance rather than to color density, the logarithmic conversion performed by the logarithmic amplifiers 21 would not be required, and the amplifier 21 would then comprise a linear type amplifier such as the Analog Devices 503 integrated circuit amplifier.

The signal appearing at the output of log amp 21 is supplied to one input of a sample and hold circuit 22 which is also provided with a sample-enabling signal pulse of approximately 20 microsecond duration from the pulse shaping circuit 80. As explained with respect to FIG. 1 of the drawings, the sample-enabling pulses are derived from a suitable register mark detector 19R shown in FIG. 1 for providing a suitable timing gating signal to the sample and hold circuits so that they will sample the output from the log amps 21 only during those intervals while a color bar is passing beneath the view of the photodetectors 19. The sample and hold circuits 22 may, for example, comprise a commercially available sample and hold circuit manufactured and sold by the GPS Corporation and identified as SH-1506 circuit.

The uncalibrated signal appearing at the output of sample and hold circuit 22 is supplied to a standardizing and zero adjust circuit comprised by an operational amplifier 82 having the input from sample and hold circuit 22 supplied thereto over a voltage dividing resistor 91 whose adjustable contact arm is directly connected to the direct input of op-amp 82. The inverse input of op-amp 82 is connected to a potentiometer comprised by a potentiometer resistor 92 for providing a zero adjust correction potential into the inverse input terminal of op-amp 82. The op-amp 82 may comprise a National Semiconductor Corporation LM 308 integrated circuit amplifier of conventional commercial construction. The compensated output of op-amp 82 therefore provides an analog measure of the color density of the elemental color area viewed by the photodetector diode 19. The remaining elemental color signal channels not shown in detail in FIG. 7, are identical in construction and operation to yellow color channel described above.

To facilitate initial alignment of the equipment, all five color signal channels have the output from the standardizing and zero adjust op-amps 82 connected through a selector switch assembly 86 to the input of a digital/analog volt meter 87. When initially aligning the equipment for operation, the sensing head housing 25 is traversed to view one of the standard blocks 53 or 53A described with relation to FIG. 2 of the drawings. Each channel then selectively is connected to the digital volt meter 87, and from previous calibrations runs, the standardizing and zero adjust potentiometers are appropriately set to provide a pre-calibrated output from the op-amplifier 82. Similar adjustments are made to each of the elemental color signal channels in sequence and the operation preferably repeated on a periodic basis and/or each use of the equipment to accommodate changes in intensity of the light source due to aging, etc. If the equipment is changed over to provide a signal proportional to reflectance rather than color density at the output of the op-amlifier 82 by substitution of linear amplifiers for the log amps 21, recalibration of the equipment in the above described manner to accommodate the reflectance signal, also would be required. It is contemplated, that both a log amp and linear amp could be employed together with suitable switching circuitry to selectively insert either a log amp or a linear amp in the optical head at the option of a user. Such an arrangement would be more expensive than equipment designed to provide only a color density output signal or alternatively only a reflectance output signal; however, for those installations where an equipment must serve both purposes, inclusion of the two different amplifier channels may be justified.

As stated previously with respect to FIG. 1 of the drawings, the sample and hold circuits 22 are designed to average signals over a number of different color bar readings in order to exclude spurious effects. Further averaging of the color signals also can be accomplished in a control computer. Similarly, standardization of the color signals can be achieved with a control computer by the development of a suitable standardization ratio utilizing the standardizing signals produced at the end of each traverse of the sensing head housing while the white and dark grey standard blocks are exposed. Standardization in this manner by the control computer would of course complement and add to the effect achieved with the standardizing and zero adjust circuits 82 so as to minimize to the greatest possible extent spurious and transient effects on the output of the equipment.

In the design of the equipment, small area, high impedance, silicon photodetector cells have been used as the light responsive devices since such cells have a more uniform response than other photosensitive devices available in the industry, and are more stable in operation. The technology of silicon photodetector cell manufacture has been developed extensively in the past several years so that the spectral response of such cells has been extended to cover the complete visible spectrum. As shown in FIG. 7, the photodetector cells are used in a short circuit mode, ie., the photodetector cell works into an operational amplifier so that the photo-current is a linear function of light and the photo-diode capacitance is shunted by the low impedance of the operational amplifier input. The advantage of this arrangement is that the photo-diode capacitance does not affect response time and the overall response of the sensing head assembly will be controlled primarily by the feedback components of the operational amplifier which are adjusted to supress transient noises to the greatest extent possible. Also careful shielding of the circuit components as well as grounding at suitable points, assists in keeping noise at a low level so as to minimize filtering requirements and providing relatively fast response time.

In operation, it is expected that the web of multicolor printed material passing under the sensing head assembly typically will be moving at a rate of about 1200 feet per minute which is 240 inches per second and converts to a rate of 1/240 or 0.82 milliseconds per inch. Assuming a 0.2 inch usable spot size on each elemental color area, then the color bar viewing time will be approximately 1.68 milliseconds. For best results, it is desirable to sample the elemental color areas of the color bars at their center. This would provide about a 0.1 inch usable spot size and results in an 820 microsecond sample time. Operational amplifiers and sample and hold circuits having response times that are in the 1 microsecond range, are commercially available so that no problem is presented in sampling the center of the elemental color areas of the color bars as they move beneath the sensing head assembly.

Figure 8:
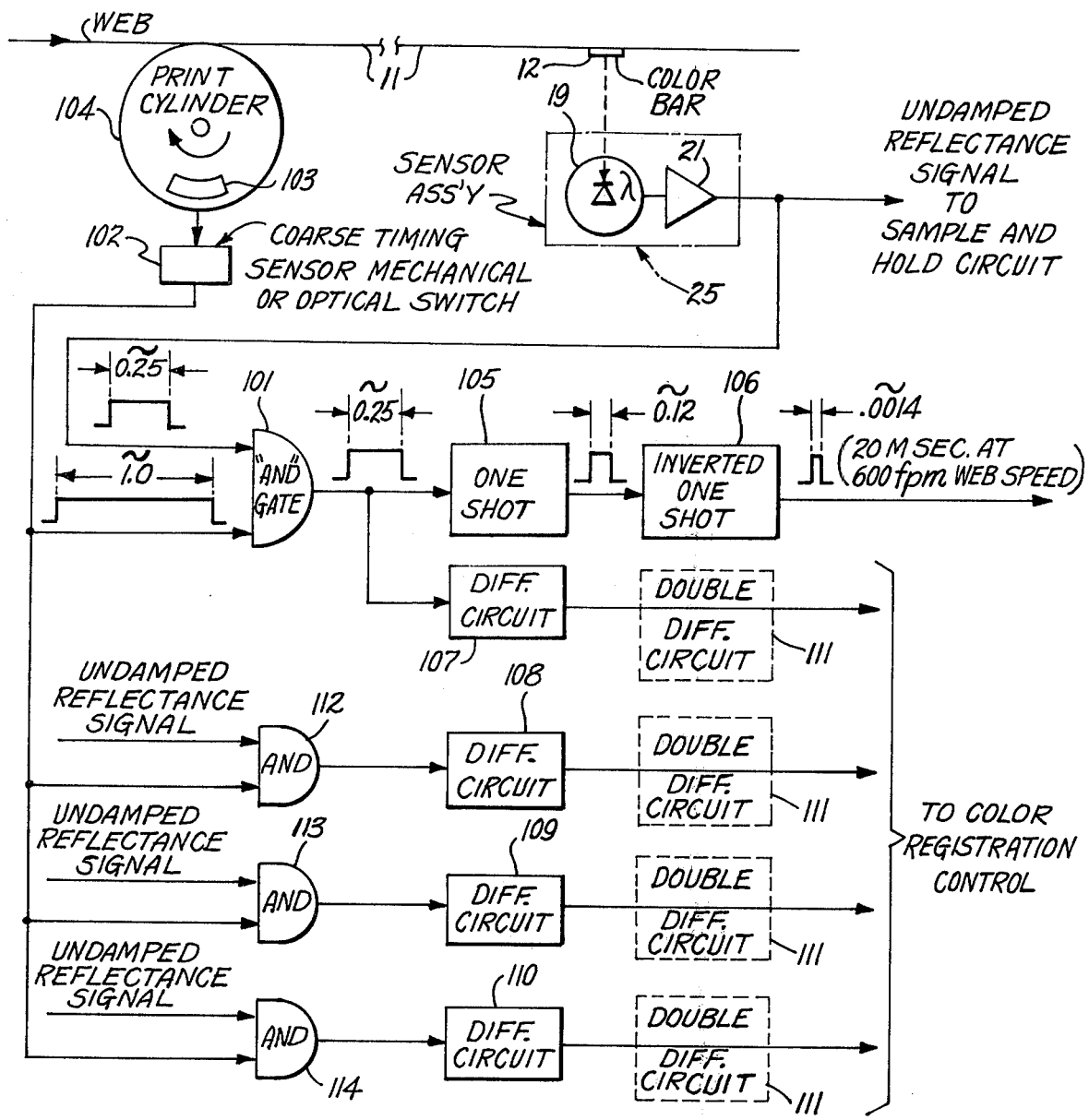
FIG. 8 is a schematic block diagram of an alternative arrangement for deriving a gating enabling signal for use with the circuitry of FIGS. 6 and 7, and also for deriving suitable color registration control signals.

FIG. 8 is a schematic functional block diagram of an alternative arrangement for deriving the required sample enable gating pulse for application to the sample and hold circuits at a point in time corresponding with the passage of the center of the elemental color area of the color bars beneath the view of the photodetector cells in the sensing head assembly. As illustrated in FIG. 8, each color sensor photodetector 19 will derive at the output of its associated amplifier 21 an essentially square wave shape signal pulse corresponding in time duration to movement of 0.25 inches of the web past a viewing point assuming web speed of about 600 feet per minute. As explained above, this output signal after amplification is supplied to one input of a sample and hold circuit for the elemental color signal in question. In addition the signal pulse is supplied to one input of a conventional AND gate 101. AND gate 101 has supplied to its second input an enabling pulse of about four times greater duration which is derived from a coarse timing mark sensor shown at 102. Sensor 102 senses a coarse timing mark 103 formed on one of the print cylinders 104 used in the multi-color printing operation. Within the tolerances required by web stretching, temperature changes, etc., the duration of the enabling pulse produced by the coarse timing sensor 102 safely can be assumed to bracket the point in time when a color bar will pass within the view of the sensing head assembly 25. Consequently, AND gate 101 will be enabled and will provide an output square wave shaped signal pulse corresponding to 0.25 inches in web movement duration. This signal pulse is supplied as the trigger input of a one-shot multivibrator 105 which is adjusted to produce an output square wave signal pulse having a time duration of one half the time duration of the signal pulse derived from the output of amplifier 21. Thus it will be appreciated that the trailing edge of the output signal pulse produced by one-shot multivibrator 105 corresponds substantially with the center of the signal pulse produced by amplifier 21, and hence will correspond in time with aproximately the center of the elemental color area being viewed. Accordingly, the output from one-shot multivibrator 105 is supplied as the trigger input into an inverted one-shot multivibrator 106 which operates in response to the trailing edge of the input pulse supplied from one-shot multivibrator 105 to produce at its output a gating enabling pulse of approximately 0.0014 inches of web movement or 20 microseconds duration. This occurs at a point of time which is substantially coincident with the passage of the center of an elemental color area under the photodetector 19 of the sensing head assembly.

In addition to providing the sample and hold gating enabling pulse in the above described manner, the circuit of FIG. 8 also can be employed to provide color registration control signals for application to an automatic color registration control for a multi-color printing press. For this purpose a plurality of differentiating circuits 107–110 are provided. The differentiating circuit 107 has its input supplied from the output of the AND gate 101. Differentiating circuits 108–110 have their inputs supplied from respective AND gates 112–114. One of the input terminals of each of the AND gates 112–114 is supplied with the coarse timing enabling pulse derived from the coarse timing sensor 102. The remaining input terminal of each of the AND gates 112–114, is supplied with the undamped reflectance color signal from each of the remaining color sensor photodetectors 19 through its associated amplifier 21 in the same manner as described above with relation to the AND gate 101. For example, assuming that the black color signal is applied as one input to the AND gate 101, then the magenta, yellow and cyan signal responses will be supplied as the respective inputs to the AND gates 112–114 in conjunction with the coarse timing signal from coarse timing sensor 102.

Figure 9A:
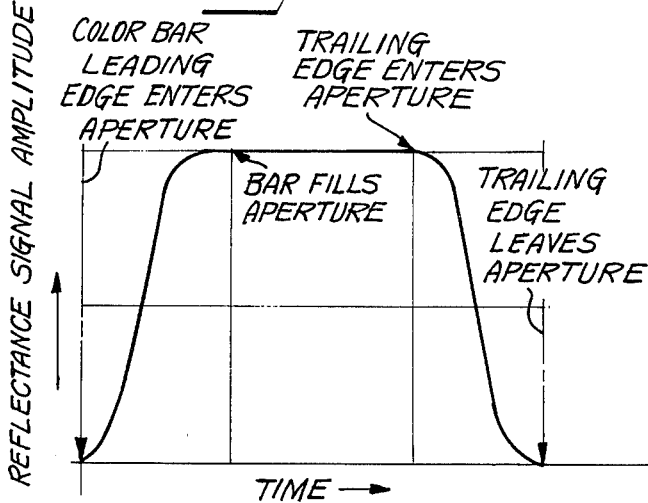
FIGS. 9A through 9C illustrate typical wave forms of the reflectance signal and the first and second derivatives thereof derived with a rectangular aperture opening (small spot reflectance) employed in the sensing head assembly.

FIG. 9A of the drawings illustrates a curve showing a typical reflectance signal level response measured with respect to time that is generated as a relatively wide color block passes a narrow aperture opening which limits the elemental color area imaged on the photodetector to a size of the order of 0.03 × 0.20 inches in area. As shown in FIG. 9A, upon the leading edge of the color bar entering the aperture, the reflectance signal amplitude rises rapidly, and then stays constant as the color bar fills the aperture opening. As the trailing edge of the color bar enters the aperture, the reflectance signal amplitude drops rapidly until it reaches zero when the trailing edge leaves the aperture opening.

Figure 9B:
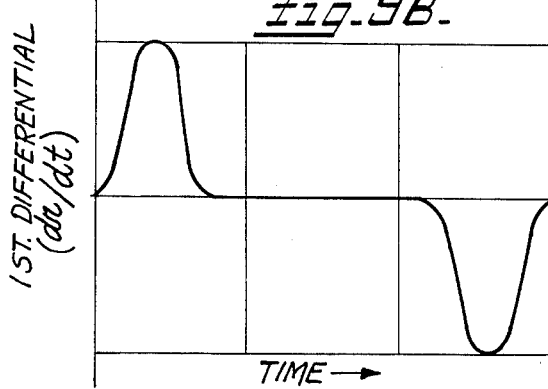

The first differential of this signal is shown in FIG. 9B of the drawings and gives a rather precise location of the leading and trailing edges of the color bar relative to time and therefore relative to the position of the material being monitored. The differentiating circuits 107–110 shown in FIG. 8 of the drawings are designed to take advantage of this phenomenon to identify the leading and trailing edges of a color bar as it enters the aperture opening of the aperture plate. The differentiated signals thus obtained may be used in conjunction with a suitable registration control system for a multicolor printing press. Through the use of the signals to properly adjust the press registration control, all of the leading and trailing edges can be brought into coincidence thus assuring proper registration.

Figure 9C:
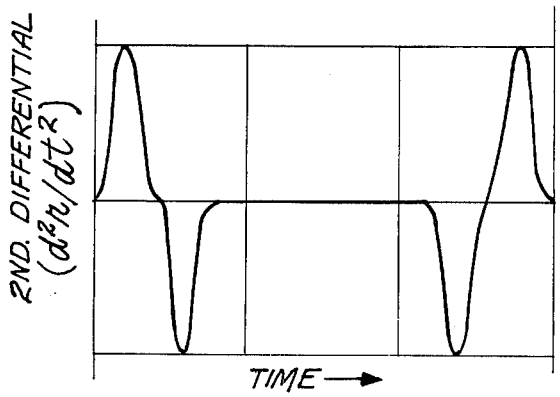

FIG. 9C illustrates the second differential of the reflectance signal shown in FIG. 9A, and, if desired, a second differentiating circuit such as those shown in dotted outline form at 111 in FIG. 8 can be employed to provide the second differential. If this is done, the double positive and negative going pulses produced by the differentiation of the first differential signal shown in FIG. 9B, results in the production of two positive going signal pulses that clearly identify the leading and trailing edges of the color bars as they enter and leave the aperture opening. Thus, the two positive going signal pulses could be employed to operate a registration control system for a multi-color press.

Figure 10A:
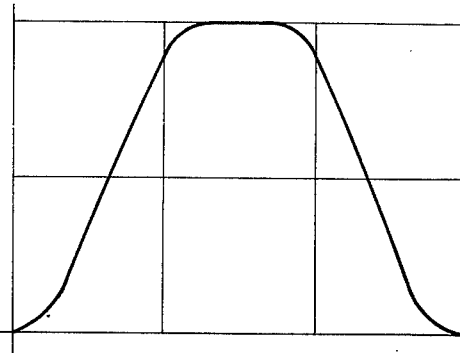
FIGS. 10A through 10C illustrate typical wave forms of the reflectance signal and the first and second derivatives thereof derived with the use of a wide aperture rectangular opening (large spot reflectance) employed in the sensing head assembly.
Figure 10B:
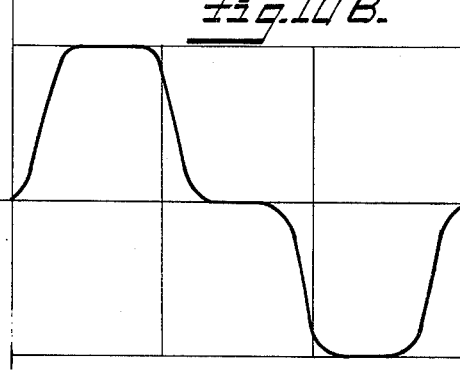
Figure 10C:
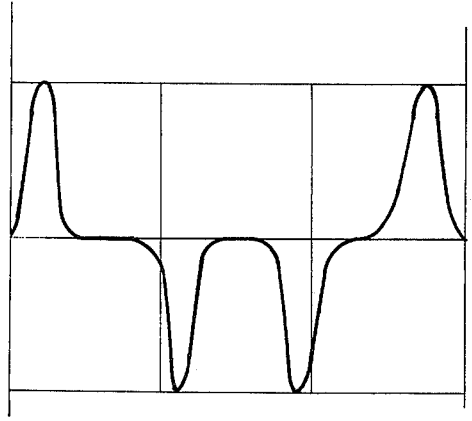

The design of equipment to employ only narrow apertures of the dimensions indicated above can for some applications lead to problems in obtaining sufficient signal response. To overcome this problem, it may be necessary to employ wide aperture openings which may be two or three times larger in size than the aperture openings described with relation to FIGS. 10A–10C. As shown in FIG. 10A, where a wide aperture opening is used, the slope of the reflectance signal amplitude is greatly decreased due to the wide aperture and therefore the first differential has a broad peak as shown in FIG. 10b. Presumably, the first differential signal shown in FIG. 10B also has a lower slope on its rising and trailing edges. Thus the signal could no satisfactorily be employed for registration control purposes. FIG. 10C of the drawings illustrates the second differential of the reflectance signal obtained with a wide aperture opening. From this Figure it will be seen that sharp, peaked positive going pulsed signals are obtained which clearly identify the leading and trailing edges of the color bar image as it appears at the aperture. Thus, the second differential pulsed signals obtained with a wide aperture system are quite satisfactory for registration control purposes.

In addition to the above described registration control function, either a first or second differentiation of the relfectance signal obtained from the outputs of one or more of the photodetector cells also could be employed to produce the necessary sample-enable gating pulse for supply to the sample and hold circuits. It would be necessary, however, to also employ a register mark sensor or a coarse marker generator along with the differential reflectance signal together with suitable delays and/or wave shaping. Consequently, the systems of FIG. 1 and FIG. 8 are preferred.

From the foregoing description, it will be appreciated that the invention provides a new and improved sensing head assembly for a multi-color printing press on-line densitometer. The sensing head assembly is relatively simple in design, construction, installation, and maintenance in comparison to prior art densitometers and provides a faster response for use in controlling automatic presses to facilitate adjustment to acceptable printed color in a minimum response time. The sensing head assembly while accomplishing this allows better maintenance of color both along and across the web of multi-color printed material.

Having described a preferred embodiment of a new and improved sensing head assembly for multi-color printing press on-line densitometers constructed in accordance with the invention, it is believed obvious that other modifications and variations of the invention will be suggested to those skilled in the art, in the light of the above teachings. It is therefore to be understood that changes may be made in the particular embodiments of the invention described which are within the full intended scope of the invention as defined by the appended claims.

What is claimed is:

1. In a sensing head assembly for a multi-color printing press on-line densitometer comprising a sensing head housing movably mounted on support members extending across the width of a material being printed by a multi-color press together with means for traversing the sensing head housing back and forth across the width of the printed material and the material being printed having printed thereon a plurality of spaced-apart color bars extending across the width of the material at predetermined intervals along its length, the color bars comprising a plurality of aligned discrete areas each printed with an elemental color such that each color bar includes all of the elemental colors appearing on the material; the improvement comprising a multiplicity of high luminance lamps mounted within the sensing head housing adjacent respective reflectors for projecting light through window means in the underside of the sensing head housing and onto a common convergence point located below the specimen plane of the material being printed for forming a high intensity spot of light that defines an inspection zone for illuminating a single selected color bar at any point along the width and length of the material, receptor objective lens means having a maximum numerical aperture for viewing an area on the printed material passing through the inspection zone and illuminated by said high luminance lamps and for projecting an image of a selected color bar onto an image plane located within the sensing head housing, means defining an aperture plane located at a position below the best focused color bar image and having respective aperture openings therein corresponding in position to each discrete elemental color area comprising the color bar, and opto-electric conversion means comprising small area high impedance semiconductor photodetector cells positioned in back of the respective aperture openings and responsive primarily only to a respective elemental color light corresponding to the discrete elemental color area of the color bar being imaged through the respective aperture opening.

2. A sensing head assembly according to claim 1 further including photometric scale standardizing means viewed by said receptor objective lens means during each traversal of said sensing head housing across the width of the printed material being inspected for providing background data reference reflectance levels, said opto-electric conversion means viewing the photo-metric scale standardizing means at the end of each traversal of the sensing head housing and deriving output calibration signals for use in calibrating the response of the opto-electric conversion means while viewing the color bars.

3. A sensing head assembly according to claim 2 wherein said photometric scale standardizing means comprise blocks having white and dark grey standard surfaces positioned at either end of the cross support members, said blocks being located under spring returned slide covers that are engaged and opened by the movable sensing head housing at the end of each traverse thereof across the width of the material being inspected to allow viewing of the blocks by the opto-electric conversion means.

4. A sensing head assembly according to claim 2 further including electric signal deriving means for deriving a separate control signal simultaneously with the viewing of the standardizing means by the opto-electric conversion means said separate control signal being used to identify the fact that standardizing signals are being developed by the opto-electric conversion means.

5. A sensing head assembly according to claim 1 wherein the opto-electric conversion means further includes separate filter members for each aperture opening in the aperture plane with the respective filter members being responsive primarily only to a respective complimentary color light corresponding to the discrete elemental color area of a color bar being imaged through that respective aperture opening, the light passing through the filter member being imaged on a respective small area, high impedance semi-conductor photodetector cell.

6. A sensing head assembly according to claim 5 wherein an aperture plate and respective light filter members for all of the aperture openings are secured together in a removable aperture plate tray for ready removal and replacement to facilitate changing of the light filter members.

7. A sensing head assembly according to claim 6 wherein the aperture openings in the aperture plate comprise narrow slit aperture openings of the order of 0.5 to 0.7 inches in cross section.

8. A sensing head assembly according to claim 6 further including photometric scale standardizing means viewed by said receptor objective lens means during each traversal of said sensing head housing across the width of the printed material being inspected for providing background data reference reflectance levels, said opto-electric conversion means viewing the photo-metric scale standardizing means at the end of each traversal of the sensing head housing and deriving output calibration signals for use in calibrating the response of the opto-electric conversion means while viewing the color bars, said photometric scales standardizing means comprising blocks having white and dark grey standard surfaces positioned at either end of the cross support members and located under spring returned slide covers, said slide covers being engaged and opened by the movable sensing head housing at the end of each traverse thereof across the width of the material being inspected to allow viewing of the standardizing blocks by the opto-electric conversion means, and electric signal deriving means for deriving a separate control signal simultaneously with the viewing of the standardizing means by the opto-electric conversion means, said separate control signal being used to identify the fact that standardizing signals are being developed by the otpo-electric conversion means.

9. A sensing head assembly according to claim 1 wherein the sensing head housing is sealed closed and cooling fan means are included for providing a positive flow of cooling air through isolated passages in the sensing head housing around the components therein for temperature control purposes and to prevent contamination, the cooling air flow being directed in a manner such that the cooling air is exhausted through passages that extend near to and across optical windows and the like to prevent the build up of dust on such surfaces.

10. A sensing head assembly according to claim 8 wherein the sensing head housing is sealed closed and cooling fan means are included for providing a positive flow of cooling air through isolated passages in the sensing head housing around the components therein for temperature control purposes and to prevent contamination, and means for directing the cooling air flow in a manner such that it is exhausted through passages that extend near to and across optical windows and the like to prevent the build up of dust on such surfaces.

11. A sensing head assembly according to claim 1 wherein the receptor objective lens means is adjustable to allow optimum imaging of a color bar passing through the inspection zone onto the aperture plane and the sensing head housing further includes a mirror and suitable aligned viewing window positioned to allow an operator of the assembly to view the image of a color bar as it is projected onto the aperture plane to thereby facilitate alignment and focusing of the assembly.

12. A sensing head assembly according to claim 10 wherein the receptor objective lens means is adjustable to allow optimum imaging of a color bar passing through the inspection zone onto the aperture plate and the sensing head housing further includes a mirror and suitable aligned viewing window positioned to allow an operator of the assembly to view the image of a color bar as it is projected onto the aperture plate to thereby facilitate alignment and focusing of the assembly.

13. A sensing head assembly according to claim 1 wherein said opto-electric conversion means is comprised by small area, high impedance semiconductor photodetector cells each of which is responsive to any color light within the visible spectrum and the aperture plane is defined by respective layers of light filter material disposed over the light responsive surfaces of said respective photodetector cells such that each cell responds only to a respective elemental color light.

14. A sensing head assembly according to claim 13 wherein the semiconductor photodetector cells and filter layers comprise a monolithic semiconductor integrated circuit structure suitably mounted with quick disconnect mounts and connectors to facilitate removal and ready replacement with similarly designed components responsive to different elemental color light.

15. A sensing head assembly according to claim 14 wherein the sensing head housing is sealed closed and cooling fan means are included for providing a positive flow of cooling air through isolated passages in the sensing head housing around the components contained therein for temperature control purposes and to prevent contamination, means for directing the cooling air flow in a manner such that it is exhausted through passages that extend to and across optical windows to prevent the build up of dust on such surfaces, the receptor objective lens means being adjustable to allow optimum imaging of a color bar passing through the inspection zone onto the aperture plate and the sensing head housing further includes a mirror and suitable aligned viewing window positioned to allow an operator of the assembly to view the image of a color bar as it is projected on the aperture plate to thereby facilitate alignment and focusing of the assembly.

16. A sensing head assembly according to claim 1 further including sample and hold circuits means mounted within the sensing head housing and responsive to the output electric signals from the respective semiconductor photodetector cells for deriving respective output electric signals representative of the small spot reflectance and therefore the printing density of the colored ink employed in printing each discrete elemental area of the color bars and gating means for sensing the presence of a color bar in the inspection zone and gating-on said sample and hold circuit means at a precise point in the movement of a color bar through the inspection zone upon the respective semiconductor photodetector cells have imaged thereon the discrete elemental color areas comprising the color bar.

17. A sensing head assembly according to claim 12 further including sample and hold circuit means mounted within the sensing head housing and responsive to the output electric signals from the respective semiconductor photodetector cells for deriving respective output electric signals representative of the small spot reflectance and therefore the printing density of the colored ink employed in printing each discrete elemental area of the color bars and gating means for sensing the presence of a color bar in the inspection zone and gating-on said sample and hold circuit means at a precise point in the movement of a color bar through the inspection zone upon the respective semiconductor photodetector cells having imaged thereon the discrete elemental color areas comprising the color bar.

18. A sensing head assembly according to claim 15 further including sample and hold circuit means mounted within the sensing head housing and responsive to the output electric signals from the respective semiconductor photodetector cells for deriving respective output electric signals representative of the small spot reflectance and therefore the printing density of the colored ink employed in printing each discrete elemental area of the color bars and gating means for sensing the presence of a color bar in the inspection zone and gating-on said sample and hold circuit means at a precise point in the movement of a color bar through the inspection zone upon the respective semiconductor photodetector cells have imaged thereon the discrete elemental color areas comprising the color bar.

19. A sensing head assembly according to claim 16 wherein said gating means comprises pulse shaping circuit means coupled to the output from at least one of said semi-conductor photodetector cells for producing an output signal pulse indicative of the movement of the center of an elemental color area of the color bar into the inspection zone, and gating-on circuit means responsive to the output from said pulse shaping circuit means and connected to control the sample and hold circuit means for gating-on said sample and hold circuit means at the precise point in the movement of a color bar through the inspection zone.

20. A sensing head assembly according to claim 17 wherein said gating means comprises pulse shaping circuit means coupled to the output from at least one of said semiconductor photodetector cells for producing an output signal pulse indicative of the movement of the center of an elemental color area of the color bar into the inspection zone, and gating-on circuit means responsive to the output from said pulse shaping circuit means and connected to control the sample and hold circuit means for gating-on said sample and hold circuit means at the precise point in the movement of a color bar through the inspection zone.

21. A sensing head assembly according to claim 1 further including differentiation circuit means coupled to the output from said opto-electric conversion means for differentiating the output signal from a plurality of semiconductor cells which are responsive to different elemental color areas on the color bar and for supplying the differentiated output signals for registration control purposes.

22. A sensing head assembly according to claim 20 further including differentiation circuit means coupled to the output from said opto-electric conversion means for differentiating the output signal from a plurality of semiconductor photodetector cells which are responsive to different elemental color areas on the color bar and for supplying the differentiated output signals for registration control purposes.

23. A sensing head assembly according to claim 1 further including separate small area light responsive opto-electric conversion devices positioned on each side of a selected traverse positioning guide point with said separate small area light responsive opto-electric conversion devices being highly responsive to elemental color light that defines the selected traverse positioning guide point, and feedback circuit means responsive to the output from the separate, small area light responsive opto-electric conversion devices for deriving feedback positioning signals for supply to the drive means for traversing the sensing head housing back and forth across the cross support member extending across the width of a material being printed whereby precise positioning of the sensing head housing at a desired point relative to a color bar can be achieved.

24. A sensing head assembly according to claim 17 further including separate small area light responsive opto-electric conversion devices positioned on each side of a selected traverse positioning guide point with said separate small area light responsive opto-electric conversion devices being selectively responsive to elemental color light that defines the selected traverse positioning guide point, and feedback circuit means responsive to the output from the separate, small area light responsive opto-electric conversion devices for deriving feedback positioning signals for supply to the drive means for traversing the sensing head housing back and forth across the cross support member extending across the width of a material being printed whereby precise positioning of the sensing head housing at a desired point relative to a color bar can be achieved.

25. In sensing head assembly for multi-color printing press on-line densitometer comprising a sensing head housing movably mounted on cross support members extending across the width of a material being printed by a multi-color press together with means for traversing the sensing head housing back and forth across the width of the material being printed and the material being printed having printed thereon a plurality of spaced-apart color bars extending across the width of the material at predetemined intervals along its length, the color bars comprising a plurality of aligned discrete areas each printed with an elemental color such that each color bar includes all of the elemental colors appearing on the material; the improvement comprising a multiplicity of high luminance lamps mounted within the sensing head housing adjacent respective reflectors for projecting light emanating from each lamp through window means formed in the underside of the sensing head housing and onto a specimen plane of material being printed to thereby define an inspection zone for illuminating selected color bars at any point along the width and length of the material, receptor objective lens means for viewing an area on the printed material passing through the inspection zone and illuminated by said high luminance lamps and projecting an image of a selected color bar onto an image plane located within the sensing head housing, means defining an aperture plane located substantially at the image plane and having respective aperture openings therein corresponding in position to each elemental color area comprising the color bar, opto-electric conversion means positioned in back of the respective aperture openings in said aperture plane and responsive primarily only to a respective elemental color light corresponding to the discrete elemental color area of the color bar being imaged through a respective aperture opening, additional small area light responsive opto-electric conversion devices positioned on each side of a selected traverse positioning guide point defined by a particular discrete elemental color area with said additional small area light responsive opto-electric conversion devices being selectively responsive to elemental color light that defines the selected traverse positioning guide point, and feedback circuit means responsive to the output from the additional small area light responsive opto-electric conversion devices for deriving feedback positioning signals for supply to the drive means for traversing the sensing head housing back and forth across the cross support member whereby precise positioning of the sensing head housing at a desired point relative to a color bar can be achieved.

26. A sensing head assembly according to claim 25 wherein the small area light responsive electro-optic conversion devices comprise small area high impedance silicon semiconductor photodetector cells and wherein centering slits for use in defining the traverse positioning guide point comprise layers of a selective light filter material formed over the light sensitive surfaces of the photodetector cells with the light selective layers having only a small area for defining an aperture opening for a respective elemental color light and exposing only a small area of the light sensitive surface of the photodetector cell only to that color light.

27. In a sensing head assembly for a multi-color printing press on-line densitometer comprising a sensing head housing movably mounted on cross support members extending across the width of a material being printed by a multi-color press together with means for traversing the sensing head housing back and forth across the width of the material being printed and the material being printed having printed thereon a plurality of spaced-apart color bars extending across the width of the material at predetermined intervals along its length, the color bars comprising a plurality of aligned discrete areas each printed with an elemental color such that each color bar includes all of the elemental colors appearing on the material; the improvement comprising a multiplicity of high luminance lamps mounted within the sensing head housing adjacent respective reflectors for projecting light emanating from each lamp through window means formed in the underside of the sensing head housing and onto a specimen plane of material being printed to thereby define an illuminated inspection zone for selected color bars at any point along the width and length of the material, receptor objective lens means for viewing an area on the printed material passing through inspection zone and illuminated by said high luminance lamps and projecting an image of a selected color bar onto an image plane located within the sensing head housing, means defining an aperture plane located substantially at the image plane and having respective aperture openings therein corresponding in position to each discrete elemental color area comprising the color bar, opto-electric conversion means positioned in back of the respective aperture openings in said aperture plane and responsive primarily only to a respective elemental color light corresponding to the discrete elemental color area of the color bar being imaged through a respective aperture opening, and differentiating circuit means coupled to the outputs from a plurality of said light sensitive opto-electric conversion means for differentiating the output pulses produced thereby and providing at least a leading edge and/or trailing edge signal pulse indicative of the movement of the leading and/or trailing edge of a plurality of elemental color areas of the color bar into the inspection zone for use as registration control signals.

28. A sensing head assembly according to claim 27 wherein said opto-electric conversion means comprise small area, high impedance semi-conductor photodetector cells and said differentiating circuit means is coupled to the output from at least two of said semiconductor light sensitive cells for differentiating the output signal pulses produced thereby and providing leading edge signal pulses indicative of the movement of the leading edge of at least two elemental color areas of the color bar into the inspection zone, and the aperture openings in the aperture plane are narrow slit apertures of the order of 0.5 ; 0.75 inches in cross section.

29. A sensing head assembly according to claim 27 further including double differentiation circuit means coupled to the output of said first mentioned differentiating circuit means for double differentiating the output signal from said opto-electric conversion means and wherein the aperture openings provided in the aperture plane are wide aperture openings.

30. In a sensing head assembly for a multi-color printing press on-line densitomter comprising a sensing head housing movably mounted on cross support members extending across the width of a material being printed by a multi-color press together with means for traversing the sensing head housing back and forth across the width of the material being printed and the material being printed having printed thereon a plurality of elemental color areas located at different points extending across the width of the material and at predetermined intervals along its length; the improvement comprising a multiplicity of high luminance lamps mounted within the sensing head housing adjacent respective reflectors suitably designed for projecting light emanating from each lamp through window means in the underside of the sensing head housing and onto the specimen plane of material being printed to thereby define an inspection zone for illuminating selected color areas at any point along the width and length of the material, receptor-objective lens means having a maximum numerical aperture for viewing an area on the printed material passing through the inspection zone and for projecting an image of selected color area onto an image plane located within the sensing head housing, means defining an aperture plane located near the image plane and having respective aperture openings therein corresponding in position to each discrete elemental color area, opto-electric conversion means positioned in back of the respective aperture openings in said aperture plate means and responsive primarily only to a respective elemental color light corresponding to the discrete elemental color area being imaged through a respective aperture opening, said opto-electric conversion means each comprising a small area, high impedance semiconductor photodetector cell, and photo-metric scale standardizing means viewed by said receptor objective lens means during each traversal of said sensing head housing across the width of the printed material being inspected for providing a background data reference reflectance level, said opto-electric conversion means viewing the photometric scale standardizing means at the end of each traversal of the sending head housing and deriving output calibration signals for use in calibrating the response of the opto-electric conversion means while viewing the color areas.

31. A sensing head assembly according to claim 30 wherein said photometric scale standardizing means comprises blocks having white and dark grey standard surfaces positioned at either end of the cross support members and located under spring returned slide covers that are engaged and opened by the movable sensing head housing at the end of each traverse thereof across the width of the material being inspected to allow the blocks to be viewed by the opto-electric conversion means.

32. A sensing head assembly according to claim 31 further including electric signal deriving means for deriving a separate control signal simultaneously with the viewing of the standardizing means by the opto-electric conversion means, said separate control signal being used to identify the fact that standardizing signals are being developed by the opto-electric conversion means.

33. A sensing head assembly according to claim 32 wherein the opto-electric conversion means further comprise separate filter members for each aperture opening with the respective filter members being responsive primarily only to a respective complimentary color light corresponding to the discrete elemental color being imaged through that respective aperture opening with the light passing through the filter member being imaged on a small area, high impedance silicon semiconductor photodetector cell and the aperture plate and respective light filter members for all the aperture openings are secured together in a removable aperture plate tray for ready removal and replacement to facilitate changing of the light filter members.

34. A sensing head assembly according to claim 33 wherein the sensing head housing is sealed closed and cooling fan means are included for providing a positive flow of cooling air through isolated passages in the sensing head housing around the components therein for temperature control purposes and to prevent contamination, the cooling air flow being directed in a manner such that the cooling air is exhausted through passages that extend near to and across optical windows and the like to prevent the buildup of dust on such surfaces.

35. A sensing head assembly according to claim 30 wherein the receptor objective lens means is adjustable to allow optimum imaging of a color area passing through the inspection zone onto the aperture plate and the sensing head housing further includes a mirror and suitably aligned viewing window positioned to allow an operator of the assembly to view the image of a color area as it is projected onto the aperture plate to thereby facilitate alignment and focusing of the assembly.

36. A sensing head assembly according to claim 34 wherein the receptor objective lens means is adjustable to allow optimum imaging of color area passing through the inspection zone onto the aperture plate and the sensing head housing further includes a mirror and suitably aligned viewing window positioned to allow an operator of the assembly to view the image of a color area as it is projected onto the aperture plate to thereby facilitate alignment and focusing of the assembly.

37. A sensing head assembly according to claim 30 wherein said opto-electric conversion means is comprised by a plurality of small area, high impedance semiconductor photodetector cells each of which is responsive to any color light within the visible spectrum and the aperture plane is defined by respective layers of the light filter material disposed over the light responsive surfaces of said respective semiconductor photodetector such that each cell responds only to a respective elemental color light with the photodetector cells and light filter layers being fabricated as a monolithic semiconductor integrated circuit structure suitably mounted within quick disconnect mounts and connectors to facilitate removal and ready replacement with similarly designed components responsive to different color elemental light.

38. A sensing head assembly according to claim 30 further including sample and hold circuit means mounted within the sensing head housing and responsive to the output electric signals from the respective semiconductor photodetector cells for deriving respective output electric signals representative of the small spot reflectance and therefore the printing density of the colored ink employed in printing each discrete elemental color area and gating means for sensing the presence of a color bar in the inspection zone and gating-on said sample and hold circuit means at a precise point in the movement of a color bar through the inspection zone such that the semiconductor photodetector cells have imaged thereon the discrete elemental color areas to be monitored.

39. A sensing head assembly according to claim 36 further including sample and hold circuit means mounted within the sensing head housing and responsive to the output electric signals from the respective semiconductor photodetector cells for deriving respective output electric signals representative of the small spot reflectance and therefor the printing density of the colored ink employed in printing each discrete elemental area and gating means for sensing the presence of a color bar in the inspection zone and gating-on sample and hold circuit means at a precise point in the movement of a color bar through the inspection zone such that the semiconducotr photodetector cells have imaged thereon the discrete elemental color areas to be monitored.

40. A sensing head assembly according to claim 38 wherein said gating means comprises pulse shaping circuit means coupled to the output from at least one of said semiconductor photodetector cells for producing an output signal pulse indicative of the movement of the center of an elemental color area into the inspection zone, and gating-on circuit means responsive to the output from said pulse shaping circuit means and connected to control the sample and hold circuit means for gating-on said sample and hold circuit means at a precise point in the movement of a color area through the inspection zone.

* * * * *